(12) United States Patent
Kang et al.

(10) Patent No.: US 9,692,627 B2
(45) Date of Patent: Jun. 27, 2017

(54) METHOD FOR REDUCING PAPR OF OFDM SIGNAL AND OFDM TRANSMITTER USING THE SAME BACKGROUND

(71) Applicant: FCI INC, Gyeonggi-Do (KR)

(72) Inventors: Byung Su Kang, Gyeonggi-do (KR); Ki Hyun Kim, Gyeonggi-do (KR)

(73) Assignee: FCI INC., Gyeonggi-Do (KR)

( * ) Notice: Subject to any disclaimer, the term of this patent is extended or adjusted under 35 U.S.C. 154(b) by 0 days.

(21) Appl. No.: 14/876,837

(22) Filed: Oct. 7, 2015

(65) Prior Publication Data

US 2017/0005844 A1    Jan. 5, 2017

(30) Foreign Application Priority Data

Jul. 3, 2015    (KR) .................. 10-2015-0095569

(51) Int. Cl.
*H04L 27/26* (2006.01)
*H04L 5/00* (2006.01)
*H04B 1/04* (2006.01)

(52) U.S. Cl.
CPC ....... *H04L 27/2615* (2013.01); *H04B 1/0475* (2013.01); *H04L 5/0007* (2013.01); *H04L 27/2628* (2013.01)

(58) Field of Classification Search
CPC .. H04L 27/2615; H04L 5/0007; H04B 1/0475
USPC ......................................................... 375/296
See application file for complete search history.

(56) References Cited

U.S. PATENT DOCUMENTS

| | | | |
|---|---|---|---|
| 2006/0133358 A1* | 6/2006 | Li ........................... | H04B 3/23 370/352 |
| 2007/0121738 A1* | 5/2007 | Yoshii ................... | H04B 1/707 375/260 |
| 2011/0116383 A1* | 5/2011 | Lipka ................... | H04L 5/0058 370/241 |
| 2013/0003627 A1* | 1/2013 | Kravtsov .......... | H04W 52/0209 370/311 |

\* cited by examiner

*Primary Examiner* — Michael Neff
(74) *Attorney, Agent, or Firm* — Mark M. Friedman

(57) ABSTRACT

A method for reducing a PAPR of an OFDM signal and an OFDM transmitter using the same are disclosed. In an OFDM transmitter, a signal processing circuit for reducing a PAPR of a modulated signal includes: a peak detector configured to detect peaks having sizes above a threshold value from an IQ baseband signal of the modulated signal and to output information on a position, a size and a phase; a memory configured to store a reference peak in time domain; a peak generator configured to generate an inverse peak signal for canceling a part of an amplitude of the IQ baseband signal from the reference peak based on the information on the position, the size and the phase; and a signal processing unit configured to add the inverse peak signal to the IQ baseband signal to constrain the amplitude of the IQ baseband signal.

14 Claims, 4 Drawing Sheets

Fig. 2
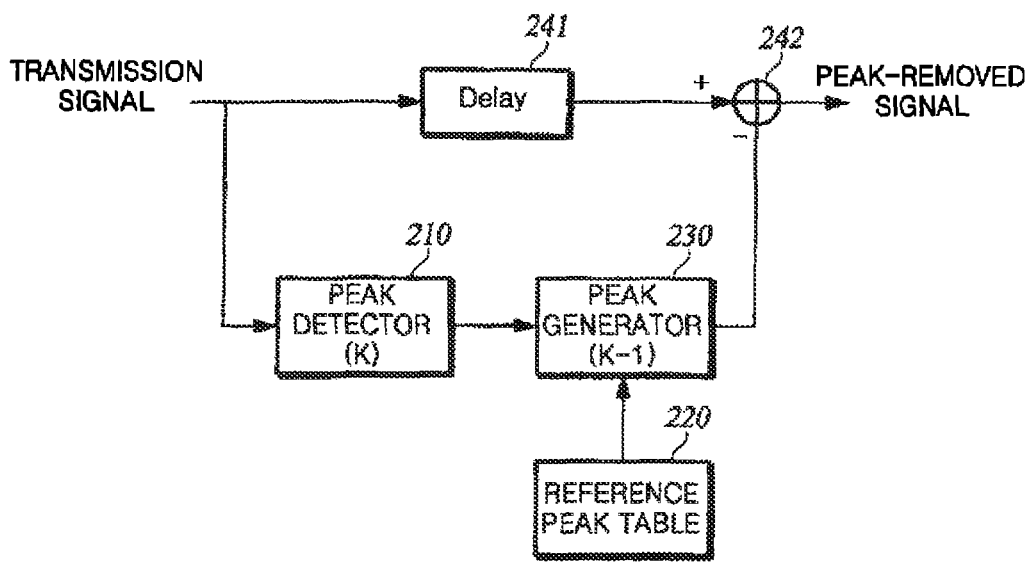
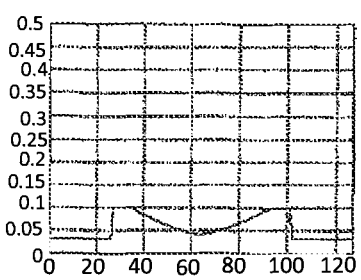
Fig. 3a
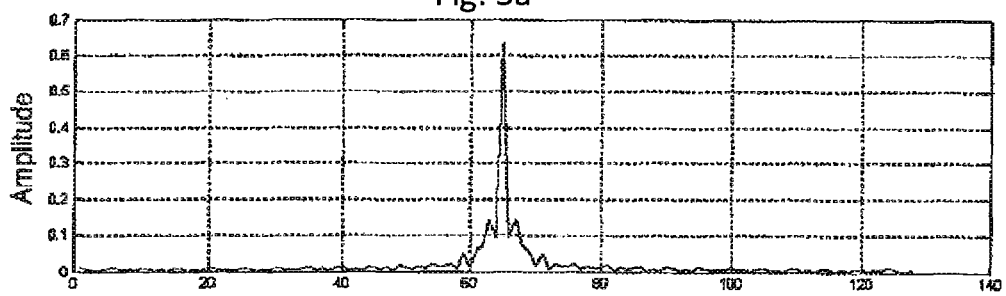
Fig 3b

METHOD FOR REDUCING PAPR OF OFDM SIGNAL AND OFDM TRANSMITTER USING THE SAME BACKGROUND

BACKGROUND

1. Technical Field

The present disclosure relates to an OFDM system. More specifically, the present disclosure relates to a method for reducing a PAPR of an OFDM signal and an OFDM transmitter using the same.

2. Description of the Related Art

The statements in this section merely provide background information related to the present disclosure and may or may not constitute prior art.

OFDM systems transmit modulation signals using a number of orthogonal sub-carriers and transmit data by dividing the entire transmission band into a number of narrow band orthogonal sub-channels. Since the OFDM orthogonal characteristics permit sub-channels to overlap and, thus, increase the spectral efficiency. In addition, OFDM systems are robust to frequency selective fading compared to a system using a single carrier.

In most wireless communications systems including OFDM systems, a high power amplifier (HPA) is employed at the transmission stage in order to obtain sufficient transmission power. In order to obtain the maximum output power from such a HPA, the operating point is usually set to be close to the saturation region. This leads to non-linear distortion and in turn in-band distortion and out-of-band radiation, thereby significantly degrading the system performance. Such non-linear characteristics of a HPA are very sensitive to a change in the amplitude of a transmission signal. Thus, in an OFDM system that transmits combined modulated signals with a number of sub-carriers, the amplitude of the transmission signal is greatly changed. As a result, the peak-to-average power ratio (PAPR) of the transmission signal is very large compared to a system using a single carrier.

Recently, a lot of research has been conducted to reduce the PAPR of an OFDM signal. Among others, the peak clipping scheme is most commonly used in currently available systems. The peak clipping scheme reduces the PAPR by setting a threshold value and simply clipping a signal above the threshold value on the time axis. This scheme can be simply implemented and can achieve a desirable PAPR performance. However, the signal waveform is not smooth but is sharply cut, so that distortion occurs in a signal to be transmitted, thereby degrading the error vector magnitude (EVM). In addition, the amount of emission into adjacent bands, i.e., the adjacent channel leakage ratio (ACLR) also becomes larger.

As another scheme, the peak windowing scheme may be employed. According to the peak windowing scheme, when a peak signal above a threshold value occurs, a window is applied the position to reduce the peak signal as well as signals around the peak signal, so that the signal is smoothly cut. As the signal is smoothly cut, the peak windowing scheme exhibits better ACLR than the peak clipping scheme. However, the peak windowing scheme fails to exhibit good EVM since signals adjacent to the peak signal are also affected. Further, if the distance between two peak signals above the threshold value is smaller than the width of the window, signals are reduced to be smaller than the threshold value, and accordingly the overall performance degrades.

BRIEF SUMMARY

An object of an exemplary embodiment of the present disclosure is to provide a method that overcomes shortcomings of exiting methods for reducing a PAPR, i.e., a method for reducing a PAPR as much as possible while an EVM specification and an ACLR specification required by an OFDM system are met, and a device using the same.

It is one aspect of the present invention to provide a signal processing circuit, in an OFDM transmitter, for reducing a peak-to-average power ratio (PAPR) of a modulated signal, the signal processing including: a peak detector configured to detect peaks having sizes above a threshold value from an IQ baseband signal of the modulated signal and to output information on a position, a size and a phase of each of the peaks; a memory configured to store a reference peak in time domain, the reference peak indicating a peak of a maximum size that is removable in the OFDM transmitter; a peak generator configured to generate an inverse peak signal for canceling a part of an amplitude of the IQ baseband signal from the reference peak based on the information on the position, the size and the phase of each of the detected peaks; and a signal processing unit configured to add the inverse peak signal to the IQ baseband signal to constrain the amplitude of the IQ baseband signal.

The signal processing circuit may further include one or more of the following features.

The reference peak may be generated according to an error vector magnitude (EVM) specification and an adjacent channel leakage ratio (ACLR) specification required by the OFDM transmitter.

The reference peak may be generated by performing an inverse Fourier transform on a signal whose in-band amplitude and out-of-band amplitude are defined according to an EVM specification and an ACLR specification required by the OFDM transmitter.

The peak generator may calculate a removal ratio for each of the detected peaks, in which a size of each of the peaks is reduced by the respective removal ratio, multiply the reference peak by the respective removal ratio calculated for each of the peaks to generate a peak signal for cancellation, and add the peak signal for cancellation to the corresponding peak taking into account the phase and position of the peak, to generate the inverse peak signal.

The peak generator may calculate the removal ratio for each of the peaks so that a power of the inverse peak signal is equal to or less than a power of the reference peak.

The peak generator may calculate the removal ratio for each of the peaks so that a peak of a large size is reduced at a greater ratio than a peak of a smaller size is.

The peak generator may calculate the removal ratio for each of the peaks so that peaks are reduced to substantially the same size as many as possible from larger ones to smaller ones among the peaks, while a power of the inverse peak signal is equal to or less than a power of the reference peak.

The removal ratio may be a function of a size of each of the peaks and a power of the reference peak.

It is another aspect of the present invention to provide a method of transmitting a signal by an OFDM transmitter, the method including: detecting peaks having sizes above a threshold value from an IQ baseband signal of a modulated signal to output information on a position, a size and a phase of each of the peaks; generating an inverse peak signal for canceling a part of an amplitude of the IQ baseband signal from a reference peak based on the information on the position, the size and the phase of each of the detected peaks, wherein the reference peak is a signal in time domain stored in advance and represents a peak of a maximum size that is removable in the OFDM transmitter; and adding the inverse peak signal to the IQ baseband signal to constrain the amplitude of the IQ baseband signal.

BRIEF DESCRIPTION OF THE DRAWINGS

The above and other aspects, features and advantages of the present invention will become apparent from the following description of exemplary embodiments given in conjunction with the accompanying drawings, in which:

FIG. 2 is a block diagram of the signal processing circuit that performs the method for reducing the PAPR according to an exemplary embodiment of the present disclosure.

FIGS. 3A and 3B are views example reference peak tables generated based on the EVM specification and the ACLR specification in frequency domain and the time domain, respectively;

DETAILED DESCRIPTION

Figure 1:
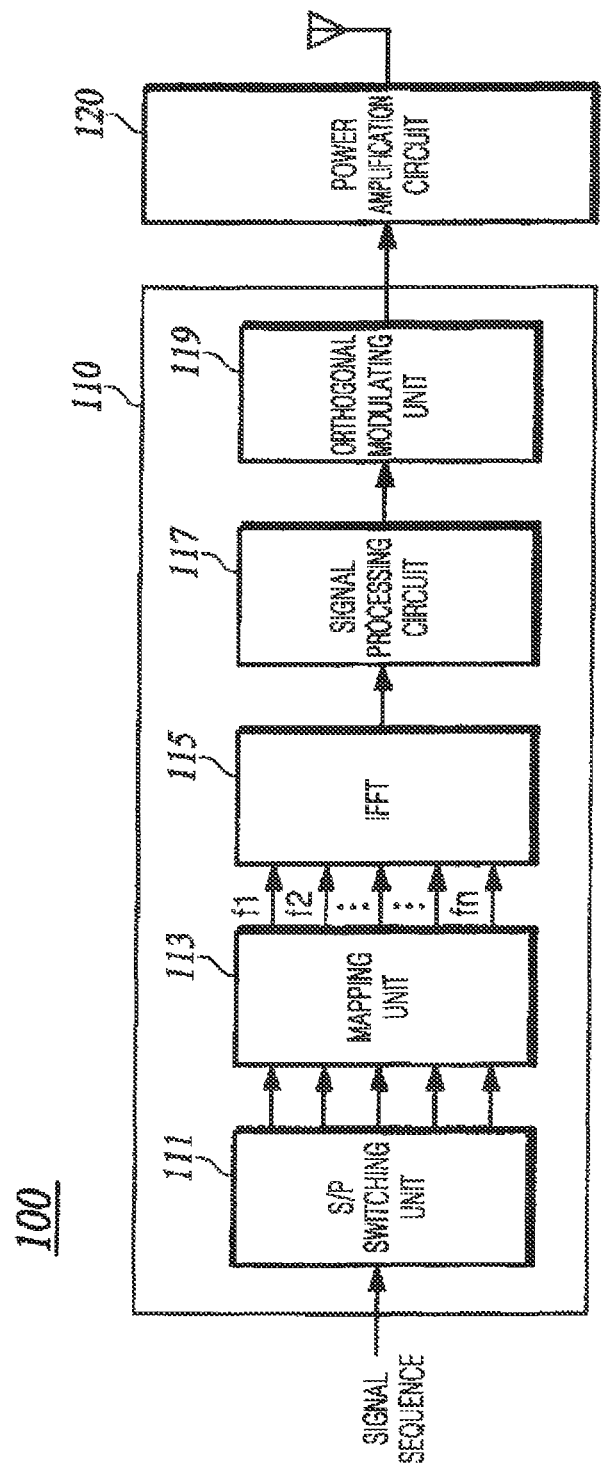
FIG. 1 is a block diagram of major elements of an OFDM transmitter according to an exemplary embodiment of the present disclosure.

Hereinafter, exemplary embodiments of the present invention will be described with reference to accompanying drawings.

FIG. 3 is a flowchart of a method of manufacturing an exterior member bonding type fingerprint recognition home key according to one embodiment of the present invention.

In the following descriptions, some exemplary embodiments of the present disclosure will be described in detail with reference to the accompanying drawings. Like reference numerals designate like elements throughout the drawings. For purposes of simplicity and clarity, detailed descriptions of well-known configuration or functionality may be omitted so as not to unnecessarily obscure the gist of the present disclosure.

The terms "fist," "second," etc., and the symbols "A," "B," "(a)," "(b)," etc., herein, if any, are used inter alia for distinguishing between similar elements and not necessarily for describing a sequential or chronological order. Throughout the descriptions, the terms "comprising," "including," "having," and the like are intended to be inclusive and mean that there may be additional elements other than the listed elements, unless specifically stated otherwise. As used herein, the terms "unit," "module" means a unit components for performing at least one function or operation and may be implemented in hardware or software or as a combination of hardware and software.

In OFDM systems, the error vector magnitude (EVM) specification and the adjacent channel leakage ratio (ACLR) specification are defined for maintaining quality of transmission signals. The EVM is a parameter for measuring modulation accuracy between an actually transmitted signal and its corresponding ideal reference signal. That is, it refers to the magnitude of the error vector between the ideal waveform and the measured waveform. The EVM is expressed in %. A 0% EVM indicates that the transmitted signal exactly matches the ideal signal. The ACLR describes the amount of the energy radiated unintentionally into adjacent channels, i.e., the ratio of in-band power to out-of-band power. That is, the ACLR refers to the power ratio leaked to adjacent carrier frequency band by its carrier signals.

Unfortunately, increasing the efficiency of operating an RF power amplifier compromises the EVM and ACLR performance due to the non-linearity of the amplifier since an OFDM signal has a large PAPR ratio. The present disclosure is to provide a method for reducing the PAPR as much as possible while the EVM and ACLR specifications required by an OFDM system are met.

FIG. 1 is a block diagram of major elements of an OFDM transmitter according to an exemplary embodiment of the present disclosure.

The OFDM transmitter 100 includes a processor for transmission 110 and a power amplification circuit 120. The processor for transmission 110 may be configured as, for example, a field programmable gate array (FPGA) having at least a memory or a CPU therein. The FPGA may set the configuration of a variety of logic circuits in advance. By doing so, the functional units as shown in FIG. 1 are configured.

The processor for transmission 110 according to the exemplary embodiment of the present disclosure includes a serial/parallel (S/P) switching unit 111, a mapping unit 113, an inverse fast Fourier transformer (IFFT) 115, a signal processing circuit 117 and an orthogonal modulating unit 119.

A serial signal sequence is input to the processor for transmission 110 and is converted into a plurality of signal sequences in the S/P switching unit 111. Then, in the mapping unit 113, the converted parallel signal sequences are converted into a plurality of sub-carrier signals f1, f2, ..., fn which have different combinations of predetermined amplitudes and phases.

The sub-carrier signals f1, f2, ..., fn are converted by the IFFT 115 into an I-signal and a Q-signal as baseband signals orthogonal to each other on the time axis. The I-signal and the Q-signal are input to the signal processing circuit 117 at the subsequent stage and are subjected to a predetermined signal process in the signal processing circuit 117. After the signal process, the IQ-signal is orthogonal-modulated in the orthogonal modulating unit 119 to be a modulated signal. The modulated signal is input to the power amplification circuit 120 at the subsequent stage. In order to reduce the PAPR of the IQ baseband signal that is a synthesized signal of the I-signals and the Q-signals on the time axis while meeting the EVM specification and the ACLR specification, the signal processing circuit 117 according to the exemplary embodiment of the present disclosure performs clipping on the IQ baseband signals. More detailed description thereon will be made below with reference to FIG. 3.

The power amplification circuit 120 includes a D/A conversion circuit (not shown) for converting the modulated signal from the orthogonal modulating unit 119 into an analog signal, a converter (not shown) for up-converting the converted analog signal to a RF frequency, and a power amplifier (not shown) for amplifying the power of the analog signal. After the amplification, the RF signal is sent out via an antenna.

FIG. 2 is a block diagram of a signal processing circuit that performs a method for reducing the PAPR according to an exemplary embodiment of the present disclosure.

Referring to FIG. 2, the signal processing signal 110 mainly includes a peak detector 210 for detecting k peaks from a signal transmitted on the time axis, a reference peak table 220 created based on the EVM specification and the ACLE specification required by an OFDM system, and a peak generator 220 for generating an inverse peak to be removed based on the table. In addition, the signal processing circuit 110 further includes a signal processing unit having a delayer 241 and an adder 242 for adding the generated inverse peak to the original signal in synchronization.

The peak detector 210 receives a signal on the time axis such as an output from the IFTF 115 in to OFDM transmitter 100 and a threshold value $P_{th}$. The peak detector 210 detects peaks lager than the threshold value, and stores information on the positions, amplitudes and phases of the first to $k^{th}$ largest peaks among the detected peaks, where k is a nature number equal to or greater than two. The number of peaks larger than the threshold value may be, of course, less than k. The information on the k peaks (i.e., information on the positions, amplitudes and phases of the peaks) detected by the peak detector is transferred to the peak generator 230.

The reference peak table 220 stores peak values calculated in advance based on the EVM specification and the ACLR specification required by an OFDM system. The EVM specification and the ACLR specification required by an OFDM system may represent the maximum allowable amount of unwanted signal components in frequency domain. By performing the IFFT on the values, peak signals in time domain can be obtained. FIGS. 3A and 3B are examples of reference peak tables generated based on the EVM specification and the ACLR specification in frequency domain and time domain, respectively. FIG. 3A shows an example of the reference peak table in frequency domain. In the reference peak table in frequency domain, the in-band amplitude and out-of-band amplitude are defined based on the EVM specification and the ACLR specification required by an OFDM transmitter. FIG. 3B shows an example of the reference peak table in the time domain. The reference peak table shown in FIG. 3B is obtained by performing the IFFT of the size of 128 on the reference peak table in frequency domain shown in FIG. 3A. By making the EVM specification and the ACLR specification bilaterally symmetric in creating the reference peak table 220, the phases of the created reference peak table 220 all become zeros, so that the size of the table 200 can be reduced. The plots of peaks thus shaped become the maximum peak that can be removed on the time axis, i.e., the reference peak.

Figure 4:
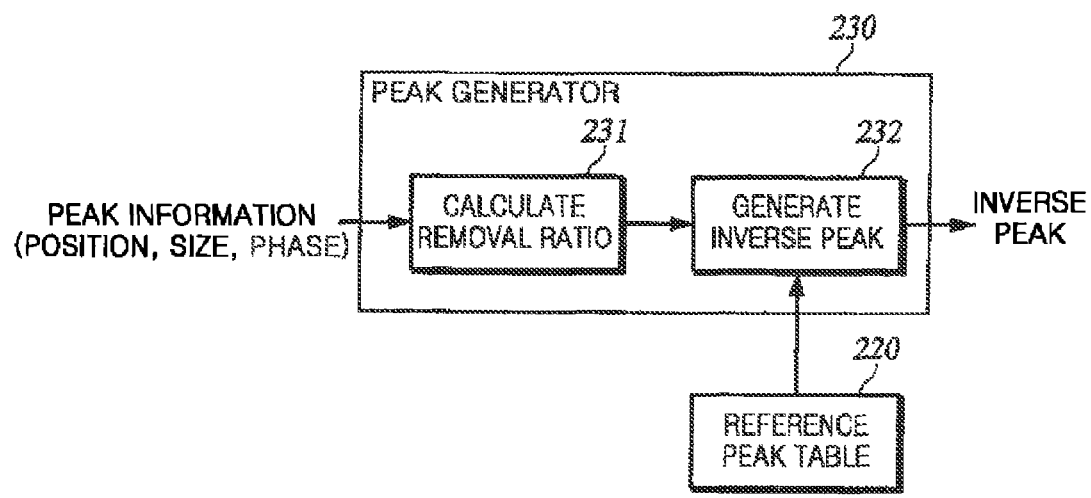
FIG. 4 is a block diagram of a peak generator according to an exemplary embodiment of the present disclosure.

FIG. 4 is a block diagram of a peak generator according to an exemplary embodiment of the present disclosure.

As shown in FIG. 4, the peak generator 230 includes a block 231 for calculating removal ratios at which the first to the $(k-1)^{th}$ largest peaks are removed based on the information on the input k peaks, and a block 232 for generating an inverse peak whose peak is reduced by multiplying the reference peak table values by the removal ratios and adding the multiplied value to the original signal.

The peak generator 230 basically performs the operation of receiving the information on the k peaks to arrange them from larger ones to smaller ones, and than performs the operation of generating an inverse peak for reducing the $(k-1)^{th}$ largest peaks to be equal to the smallest $k^{th}$ peak. If the power of the generated inverse peak is larger than the peak power of the reference peak table 220, the EVM specification and the ACLR specification constrained by the system cannot be met. Therefore, it is necessary to calculate based on the information on the amplitudes of the k peaks the minimum amplitudes of the peaks that allow the PAPR to become as small as possible while the generated inverse peak does not exceed the peak power of the reference peak table 220. The removal ratio is a value calculated for each of (k-1) peaks so that the reference peak is multiplied by the removal ratio and the multiplied value is added to a peak in anti-phase, to reduce the peak value to a desired size. Accordingly, the removal ratio ranges zero to one. In addition, the sum of the squares of the (k-1) removal ratios is also equal to and greater than zero and less than one.

For example, if the difference between the first largest peak and the second largest peak is larger than the peak stored in the reference peak table, all of the values in the reference peak table have to be used to reduce the largest peak. Accordingly, the removal ratio for the first peak is one, and the removal ratios for the rest of the peaks are zeros. The removal ratios of the peak generator may be determined according to different conditions depending on the value of K. For convenience of illustration, the operation will be described on the assumption that the value of K is four.

Figure 5:
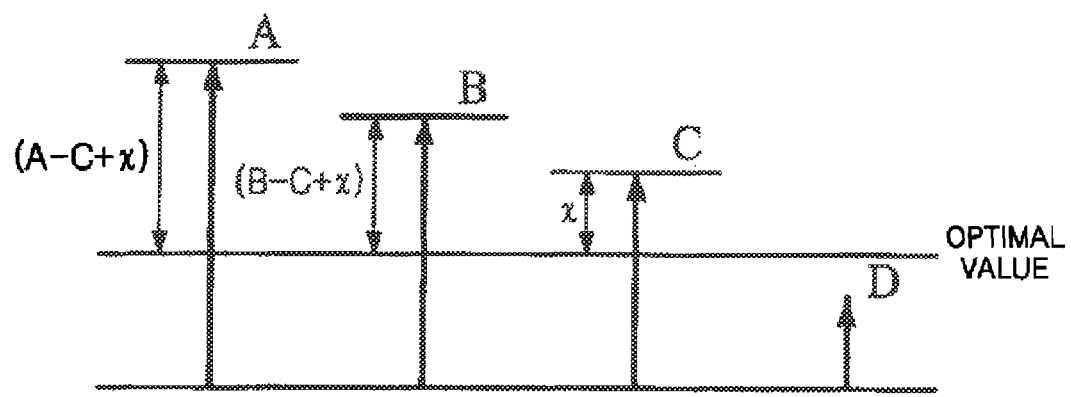
FIG. 5 is a view for illustrating a calculation process for determining a removal ratios when K is four.

FIG. 5 is a view for illustrating a calculation process for determining a peak removal ratio when K is four.

Let us assume that, among the peaks arranged in order of amplitude as inputs to the peak generator 230 where K 4, the size of the first largest peak is denoted by A, the size of the second largest peak is denoted by B, the size of the third largest peak is denoted by C, the size of the smallest peak is denoted by D, and the maximum peak value in the reference peak table 200 is denoted by T. In addition, let us assume that the peak removal ratios for the peaks of the sizes A, B and C are denoted by R1, R2 and R3, respectively. Then, the peak generator 230 according to an exemplary embodiment of the present disclosure determines the peak removal ratios depending on following four conditions:

$$\text{if, } (A-D)^2+(B-D)^2+(C-D)^2<T^2 \qquad \text{[Condition 1]}$$

Condition 1 is the case that A, B and C are adjusted to the size of D so that the overall power is less than the power of the peak stored in the peak table. In this case, R1, R2 and R3 are set as expressed in Equation 1 so that the sizes of the first to third largest peaks become equal to the size of the fourth largest peak. Once the removal ratios are calculated, the values stored in the reference peak table 220 are multiplied by the respective removal ratios, and then the multiplied values are added to the peaks in anti-phase at the respective peak positions. As a result, the sizes A, B and C of peaks can be reduced to the size of D.

$$R1 = \frac{A-D}{T}, R2 = \frac{B-D}{T}, R3 = \frac{C-D}{T} \qquad \text{[Equation 1]}$$

$$\text{else if, } (A-C)^2 + (B-C)^2 < T^2 \qquad \text{[Condition 2]}$$

Figure 6:
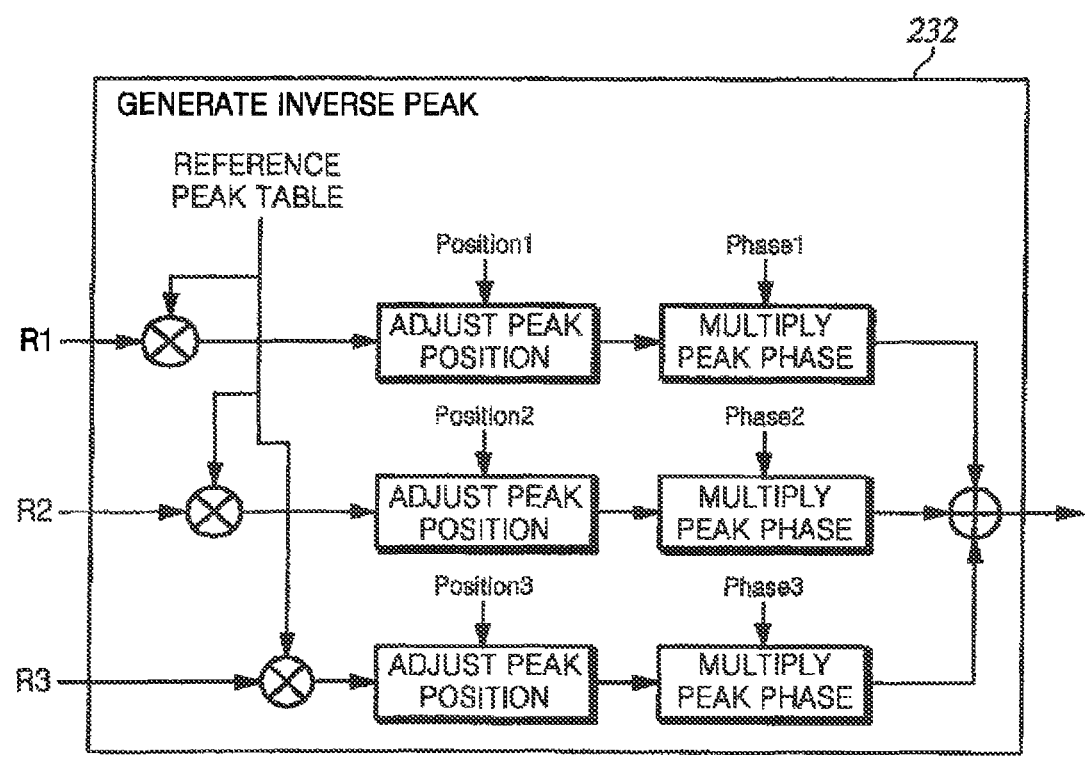
FIG. 6 is a view for schematically illustrating a process of generating an inverse peak from a removal ratio, position information and phase information of each of peaks.

Condition 2 may be the case that the power is insufficient for setting the sizes of the first to third largest peaks to be equal to the size of the fourth peak and the power is excessive for setting the sizes of the first and second largest peaks to be equal to the size of the third peak. In this case, the peaks having the size A, B and C has to be reduced to third optimal value between C and D, as shown in FIG. 6. This optimal value has to be determined to be the smallest value that meets the EVM specification and the ACLR specification required by the system.

Assuming that the difference between C and the optimal value is denoted by x, the power when the first largest peak is reduced to the optimal value may be expressed as $(A-C+x)^2$, the power when the second largest peak is reduced to the optimal value may be expressed as $(B-C+x)^2$, and the power when the third largest peak is reduced to the optimal value may be expressed as $x^2$. The value of x that makes the sum of the powers equal to the peak power $T^2$ can be obtained from Equation 2.

$$(A-C+x)^2+(B-C+x)^2+x^2=T^2 \quad \text{[Equation 2]}$$

From the above calculation, the peak ratio in Condition 2 may be calculated in Equation 3:

$$R1 = \frac{K+x}{T}, R2 = \frac{M+x}{T}, R3 = \frac{x}{T} \quad \text{[Equation 3]}$$

where K denotes (A–C), and M denotes (B–C).

$$\text{else if, } (A-B)<T \quad \text{[Condition 3]}$$

Condition 3 may be the case that the power is insufficient for setting the sizes of the first and second largest peaks to be equal to the size of the third peak and the power is excessive for setting only the size of the first largest peak to be equal to the size of the second peak. Similar to Condition 2, the peak removal ratios in Condition 3 may be calculated in Equation 4:

$$R1 = \frac{K+x}{T}, R2 = \frac{x}{T}, R3 = 0 \quad \text{[Equation 4]}$$

where K is (A–B). R3 is zero since the third largest peak cannot be reduced.

[Condition 4]

None of The Above Conditions are Applicable

Condition 4 may be the case that the power is larger than the peak power of the reference peak table 220 even if only the first largest peak is reduced to the second largest peak. Accordingly, only the first largest peak is reduced, and other peaks cannot be reduced, so that R1 is one and the others are all zeros.

According to this method, peaks are reduced to substantially the same size as many as possible from larger ones to smaller ones among the K peaks, while a power of the inverse peak signal is equal to or less than a power of the reference peak. Once the peak removal ratios are calculated in this manner, an inverse peak is generated. Referring to FIG. 6, a method for generating an inverse peak will be described.

FIG. 6 is a view schematically illustrating a process of generating an inverse peak from the removal ratios for peaks, position information and phase information.

Initially, the reference peak defined in the reference peak table 220 is multiplied by peak removal ratios, and adjusted to a position where a peak to be removed exists based on the position information. Then, peak phase information is received and the phase value is multiplied by 180 degree in anti-phase. This value is added to the original signal, and thus the size of the peak is reduced. The (k−1) outputs obtained in this manner are added to generate an inverse peak.

Finally, the generated inverse peak is added to the original signal in synchronization. As a result, a signal with reduced PAPR is obtained while the EVM specification and the SCLR specification required by the system are met.

According to the method of the present disclosure, performance and complexity can be determined depending on the value of K. Further, since the values in the reference peak table are calculated in advance, it is easy to apply for different EVM specification and ACLR specification by simply changing the value stored in the reference peak table 220.

According to exemplary embodiment of the present disclosure, peaks generated in output signals on time axis of a transmitter on an OFDM system is detected, and an inverse peak is generated that meets an EVM specification and an ACLR specification required by the system and is added to the signals, so that the PAPR of the signals is reduce.

In addition, a reference peak table used in generating an inverse peak is calculated separately and is stored in a memory to decrease the implementation complexity. Further, it is easy to apply for different EVM specification and ACLR specification by simply changing the value stored in the reference peak table.

The foregoing descriptions are merely examples for illustrating the technical idea of the present disclosure and those skilled in the art would understand that that various modifications and alterations may be made thereto without departing from the essential features of the present disclosure. Accordingly, it should be understood that the exemplary embodiments of the present disclosure are not intended to limit the scope of the present disclosure to the particular form disclosed, but on the contrary, to cover all modifications, equivalents, and alternatives falling within the spirit and scope of the present disclosure as defined solely by the appended claims.

What is claimed is:

1. A signal processing circuit, in an orthogonal frequency division multiplexing (OFDM) transmitter, for reducing a peak-to-average power ratio (PAPR) of a modulated signal, the signal processing circuit comprising:
    a peak detector configured to detect peaks having sizes above a threshold value from an in-phase/quadrature (IQ) baseband signal of the modulated signal and to output information on a position, a size and a phase of each of the peaks;
    a memory configured to store a reference peak in time domain, the reference peak indicating a peak of a maximum size that is removable in the OFDM transmitter;
    a peak generator configured to generate an inverse peak signal for canceling a part of an amplitude of the IQ baseband signal from the reference peak based on the information on the position, the size and the phase of each of the detected peaks; and
    a signal processing unit having a delayer and an adder, and configured to add the inverse peak signal to the IQ baseband signal to constrain the amplitude of the IQ baseband signal;
    wherein the peak generator is configured to calculate a removal ratio for each of the detected peaks, wherein a size of each of the peaks is reduced by the respective removal ratio, to multiply the reference peak by the respective removal ratio calculated for each of the peaks to generate a peak signal for cancellation, and to add the peak signal for cancellation to the corresponding peak taking into account the phase and position of the peak, to generate the inverse peak signal.

2. The signal processing circuit of claim 1, wherein the reference peak is generated according to an error vector magnitude (EVM) specification and an adjacent channel leakage ratio (ACLR) specification required by the OFDM transmitter.

3. The signal processing circuit of claim 1, wherein the reference peak is generated by performing an inverse Fourier transform on a signal whose in-band amplitude and out-of-band amplitude are defined according to an error vector magnitude (EVM) specification and an adjacent channel leakage ratio (ACLR) specification required by the OFDM transmitter.

4. The signal processing circuit of claim 1, wherein the peak generator is configured to calculate the removal ratio for each of the peaks so that a power of the inverse peak signal is equal to or less than a power of the reference peak.

5. The signal processing circuit of claim 1, wherein the peak generator is configured to calculate the removal ratio for each of the peaks so that a peak of a large size is reduced at a greater ratio than a peak of a smaller size is.

6. The signal processing circuit of claim 1, wherein the peak generator is configured to calculate the removal ratio for each of the peaks so that peaks are reduced to substantially the same size as many as possible from larger ones to smaller ones among the peaks, while a power of the inverse peak signal is equal to or less than a power of the reference peak.

7. The signal processing circuit of claim 1, wherein the removal ratio is a function of a size of each of the peaks and a power of the reference peak.

8. A method of transmitting a signal by an orthogonal frequency division multiplexing (OFDM) transmitter, the method comprising:
   detecting peaks having sizes above a threshold value from an in-phase/quadrature (IQ) baseband signal of a modulated signal to output information on a position, a size and a phase of each of the peaks;
   generating an inverse peak signal for canceling a part of an amplitude of the IQ baseband signal from a reference peak based on the information on the position, the size and the phase of each of the detected peaks, wherein the reference peak is a signal in time domain stored in advance and represents a peak of a maximum size that is removable in the OFDM transmitter; and
   adding the inverse peak signal to the IQ baseband signal to constrain the amplitude of the IQ baseband signal;
   wherein the adding the inverse peak signal to the IQ baseband signal comprises: calculating a removal ratio for each of the detected peaks, multiplying the reference peak by the respective removal ratio calculated for each of the peaks to generate a peak signal for cancellation, and adding the peak signal for cancellation to the corresponding peak taking into account the phase and position of the peak, to generate the inverse peak signal.

9. The method of claim 8, wherein the reference peak is calculated in advance according to an error vector magnitude (EVM) specification and an adjacent channel leakage ratio (ACLR) specification required by the OFDM transmitter.

10. The method of claim 8, wherein the reference peak is generated by performing an inverse Fourier transform on a signal whose in-band amplitude and out-of-band amplitude are defined according to an error vector magnitude (EVM) specification and an adjacent channel leakage ratio (ACLR) specification required by the OFDM transmitter.

11. The method of claim 8, wherein the calculating the removal ratio comprises calculating the removal ratio for each of the peaks so that a power of the inverse peak signal is equal to or less than a power of the reference peak.

12. The method of claim 8, wherein the calculating the removal ratio comprises calculating the removal ratio for each of the peaks so that a peak of a large size is reduced at a greater ratio than a peak of a smaller size is.

13. The method of claim 8, wherein the calculating the removal ratio comprises calculating the removal ratio for each of the peaks so that peaks are reduced to substantially the same size as many as possible from larger ones to smaller ones among the peaks, while a power of the inverse peak signal is equal to or less than a power of the reference peak.

14. The method of claim 8, wherein the removal ratio is a function of a size of each of the peaks and a power of the reference peak.

* * * * *